United States Patent Office 3,226,417
Patented Dec. 28, 1965

3,226,417
2-CYANOVINYL ALKYLXANTHATES
Norbert M. Bikales, Livingston, N.J., assignor to American Cyanamid Company, Stamford, Conn., a corporation of Maine
No Drawing. Filed Dec. 10, 1962, Ser. No. 243,615
6 Claims. (Cl. 260—455)

This invention relates to the provision of a new class of compounds. More particularly, it relates to a class of 2-cyanovinyl alkylxanthates which can be prepared by the novel reaction of a metal salt of an O-xanthic ester with β-haloacrylonitrile.

It is an object of this invention to provide, as a new class of compounds, S-(2-cyanovinyl) O-xanthic acid esters by a new reaction in which a metal salt of an O-xanthic ester is cyanovinylated with a β-halocrylonitrile. It is a further object of this invention to provide a class of compounds which are useful as promoters in the beneficiation of ores by froth flotation. It is still a further object of this invention to provide a class of compounds which have insecticidal, fungicidal and bacteriocidal properties.

Other objects will be apparent from the following detailed description in conjunction with examples showing preferred embodiments of the present invention.

The 2-cyanovinyl alkylxanthates of the present invention may be represented by the following general Formula I:

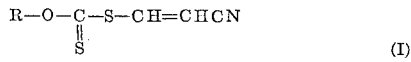

wherein R is an alkyl or aralkyl group. Alkyl groups may contain up to twelve carbons and may be substituted with one or more (e.g., up to about three) electronegative groups such as halogen (e.g., chloro, bromo, and fluoro), nitro, cyano, lower alkoxy or amino groups. Aralkyl groups may be monocyclic (lower alkyl) or bicyclic (lower alkyl) groups having up to about three halo (e.g., fluoro, chloro or bromo), lower alkyl, cyano, lower alkoxy, amino or nitro radicals.

Compounds of Formula I are prepared by the reaction of a β-haloacrylonitrile with a metal salt of an O-xanthic acid ester, represented by the following Equation A:

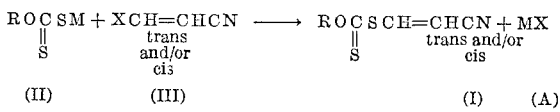

wherein M is an alkali metal (e.g., potassium or sodium), R is as defined above and X is chloro or bromo. The reaction may be advantageously conducted by contacting the reactants at ambient temperatures or lower (e.g., about 0°–30° C.). Proportions are not critical and equimolar amounts or an excess of either reactant, may be used. The reaction can be carried out in aqueous medium, in which case the product separates as an oil and the alkali metal halide stays in solution. Or else an inert organic solvent such as acetone, chloroform or ether, may be used, in which case the product remains in solution and the salt separates as a precipitate. If desired, the product may be purified by conventional methods, employing solvents for extraction from aqueous reaction media followed by distillation.

Among the alkali metal xanthates which can be named as suitable for reaction with either β-chloroacrylonitrile or β-bromoacrylonitrile are the sodium and potassium salts of the following O-xanthates:

(1) Alkylxanthates such as methylxanthate, ethylxanthate, isopropylxanthate, n-butyl and secondary butylxanthate, amylxanthate, hexylxanthate, octylxanthate, dodecylxanthate, 2 - chloroethylxanthate, nitromethylxanthate, 2-methoxyethylxanthate, 2-n-propylxanthate, 2-cyanoethylxanthate, and the like; and (2) Aralkylxanthates such as benzylxanthate, phenethylxanthate, α-naphthylmethylxanthate, 3,4-dichlorobenzylxanthate, p-chlorophenethylxanthate, xylylmethylxanthate, p-cyanobenzylxanthate, anisylmethylxanthate, p-nitrobenzylxanthate, p-aminobenzylxanthate, and the like.

Compounds of Formula I have useful biocidal properties, being active in inhibiting the growth of such fungi as Aspergillus flavus, Chaetomium globosum, Fusarium moniliforme, Penicillium citrinum and Trichoderma viride; and such bacteria as Bacillus mycoides. Furthermore, they are active insecticides, giving 100% kill against aphids at concentrations below about 1%.

Additionally, such compounds have valuable froth-flotation promoting properties, and can be used in conventional flotation operations for the recovery of copper, lead, zinc and iron from sulfide ores containing these metals.

The following examples are presented to further illustrate the present invention.

EXAMPLE 1

2-cyanovinyl ethylxanthate

To 16.0 g. of potassium ethylxanthate in 50 ml. of water, there was added 9.7 g. of cis-β-chloroacrylonitrile over a 15 minute period. A slight exotherm was noted. The mixture, after having been stirred for 24 hours at room temperature, consisted of an aqueous layer, an oil, and a suspended solid. The latter, weighing 1.2 g., melted at 140–142° C. and was identified as cis-β,β'-thiodiacrylonitrile, a by-product. The oil was extracted with chloroform, washed with water, treated with activated carbon, and filtered. The solvent was then removed at high vacuum leaving 14.0 g. (81% yield) of a brown oil, $n_D^{25}$ 1.5868, identified as cis-2-cyanovinyl ethylxanthate.

EXAMPLE 2

2-cyanovinyl isopropylxanthate

The procedure of Example 1 was repeated, except that the reaction was carried for 2 hours at 10° C. followed by 1 hour at room temperature. The reactants were 15.8 g. of sodium isopropylxanthate and 8.8 g. of cis-β-chloroacrylonitrile. In addition to a small quantity of β,β'-thiodiacrylonitrile, cis-2-cyanovinyl isopropylxanthate was obtained as a brown oil weighing 13.5 g. (72% yield), $n_D^{25}$ 1.5722.

EXAMPLE 3

2-cyanovinyl amylxanthate

To 20.2 g. of potassium amylxanthate in 100 ml. of acetone there was added over a 15 minute period a solution of 9.6 g. of cis-β-chloroacrylonitrile dissolved in 50 ml. of acetone. The mixture was stirred and kept below 15° C., both during the addition and for 3 hours thereafter. The slurry was filtered to remove potassium chloride. The filtrate was then treated with activated carbon and filtered. Upon evaporation of the solvent under a high vacuum, there remained an oil with a few suspended crystals of β,β'-thiodiacrylonitrile which were removed by filtration. The product, cis-2-cyanovinyl amylxanthate, was a brown oil, $n_D^{27}$ 1.5444, weighing 13.5 g. (63% yield).

EXAMPLE 4

2-cyanovinyl isopropylxanthate

The procedure of Example 3 was repeated except that 15.8 g. of sodium isopropylxanthate was used and that the β-chloroacrylonitrile was the trans isomer. The product was obtained as a light yellow oil, $n_D^{24}=1.5858$. The yield was 14.7 g. (79%). The infrared spectrum showed bands at 2220 (nitrile), 1577 (double bond), 1037, 1090 and 1257 cm.$^{-1}$ (xanthate ester). In addition, it showed bands at 850 and 988 cm.$^{-1}$ which are similar to those of other known trans-substituted acrylonitriles. The product is, therefore, trans-cyanovinyl isopropylxanthate. Less than 2%, if any, cis isomer was present.

EXAMPLE 5

2-cyanovinyl ethylxanthate

The procedure of Example 4 was repeated, except that 16.0 g. of potassium ethylxanthate was used. The product was obtained as a yellow liquid $n_D^{25}=1.5993$; in a 74% yield. There was also collected 1.6 g. of trans-β,β'-thiodiacrylonitrile, melting point 128–9° C., as a by-product. The product exhibited bands in the infrared at 847, 930, 997 cm.$^{-1}$ (trans), 1040, 1240 cm$^{-1}$ (xanthate ester), 1575 cm.$^{-1}$ (double bond), 2220 cm.$^{-1}$ (nitrile). There was no band at 710 cm.$^{-1}$, where cis-β-substituted acrylonitriles absorb. It can be seen that the reaction is highly stereo-specific, i.e., cis-β-chloroacrylonitrile gives cis esters, while trans-β-chloroacrylonitrile gives trans esters. Likewise, a racemic mixture gives a racemic product.

EXAMPLE 6

2-cyanovinyl dodecylxanthate

The product is obtained by following the procedure of Example 3 except for the substitution of an equimolar amount of potassium dodecylxanthate for the xanthate used therein.

EXAMPLE 7

2-cyanovinyl nitromethylxanthate

The product is obtained by following the procedure of Example 3 except for the substitution of an equimolar amount of nitromethylxanthate for the xanthate used therein.

EXAMPLE 8

2-cyanovinyl cyanoethylxanthate

The product is obtained by following the procedure of Example 3 except for the substitution of cyanoethylxanthate for the xanthate used therein.

EXAMPLE 9

2-cyanovinyl phenethylxanthate

The product is obtained by following the procedure of Example 3 except for the substitution of an equimolar amount of phenethylxanthate for the xanthate used therein.

EXAMPLE 10

Products of the preceding examples are employed as promoters in the following manner:

A copper ore (0.8% Cu) from the Western United States is ground for 6 minutes at 60% solids with 0.03 lb. of promoter per ton of ore, is conditioned for 3 minutes at 22% solids with 0.025 lb. fuel oil and 0.09 lb. cresylic acid per ton of ore and floated for 6 minutes at pH of 7.7. The tailing is filtered off, dried and analyzed for residual copper with the following results.

TABLE I

| No. | Compound | Percent Cu in Tailing |
|---|---|---|
| 1 | $\begin{array}{c}CH_3\\ \diagdown\\ \phantom{CH_3}CHOCSCH=CHCN\text{ (trans)}\\ \diagup\\ CH_3\end{array}$<br>trans-cyanovinyl isopropylxanthate | 0.13 |
| 2 | $\begin{array}{c}CH_3\\ \diagdown\\ \phantom{CH_3}CHOCSCH=CHCN\text{ (cis)}\\ \diagup\\ CH_3\end{array}$<br>cis-cyanovinyl isopropylxanthate | 0.16 |
| 3 | $C_5H_{11}O\overset{\overset{S}{\|}}{C}SCH=CHCN$ (cis)<br>cis-cyanovinyl amylxanthate | 0.16 |
| 4 | $C_2H_5O\overset{\overset{S}{\|}}{C}SCH=CHCN$ (cis)<br>cis-cyanovinyl ethylxanthate | 0.17 |

EXAMPLE 11

A second copper ore (0.68% Cu) from the Western United States was ground 6 minutes at 60% solids with 1.5 lb. lime/ton (pH=7.8) and 0.05 lb. promoter/ton, conditioned 5 minutes at 22% solids with 0.1 lb. polypropylene glycol per ton as frother, and floated for 4 minutes. Used as promoters were the product of Example 2 and allyl amylxanthate, a well-known promoter (for comparison). The following results are obtained.

TABLE II

| No. | Compound | Percent Cu in Tailing |
|---|---|---|
| 1 | Allyl amylxanthate | 0.16 |
| 2 | cis-cyanovinyl isopropylxanthate | 0.081 |

I claim:
1. A cyanovinylxanthate of the following formula:

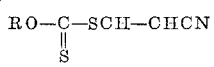

wherein R is a member selected from the group consisting of alkyl radicals having up to twelve carbon atoms and lower aralkyl radicals of less than three rings.
2. The compound of claim 1 wherein R is ethyl.
3. The compound of claim 1 wherein R is isopropyl.
4. The compound of claim 1 wherein R is sec-butyl.
5. The compound of claim 1 wherein R is amyl.
6. The compound of claim 1 wherein R is octyl.

References Cited by the Examiner
UNITED STATES PATENTS

| | | | |
|---|---|---|---|
| 1,440,962 | 1/1923 | Cadwell | 260—455 |
| 2,307,679 | 1/1943 | Heckenbleikner. | |
| 2,316,743 | 4/1943 | Marsh | 209—166 |
| 2,636,604 | 4/1953 | Anderson | 209—166 |
| 2,696,496 | 12/1954 | Craig | 260—455 |
| 2,865,941 | 12/1958 | D'Amico | 260—455 |

OTHER REFERENCES

Reid: Organic Chemistry of Bivalent Sulfur, 1962, vol. IV, p. 163.

CHARLES B. PARKER, *Primary Examiner*.

H. L. MARTIN, *Examiner*.

UNITED STATES PATENT OFFICE
CERTIFICATE OF CORRECTION

Patent No. 3,226,417                            December 28, 1965

Norbert M. Bikales

It is hereby certified that error appears in the above numbered patent requiring correction and that the said Letters Patent should read as corrected below.

Column 4, lines 48 to 50, the formula should appear as shown below instead of as in the patent:

$$RO-\underset{\underset{S}{\|}}{C}-SCH=CHCN$$

Signed and sealed this 29th day of November 1966.

(SEAL)
Attest:

ERNEST W. SWIDER                            EDWARD J. BRENNER
Attesting Officer                                    Commissioner of Patents